(12) United States Patent
Marti et al.

(10) Patent No.: US 7,455,635 B2
(45) Date of Patent: Nov. 25, 2008

(54) CASTING ROLLER FOR A DOUBLE-ROLLER CONTINUOUS CASTING MACHINE

(75) Inventors: Heinrich Marti, Forch (CH); Jacques Barbé, Tarantaise (FR); Benno Steiner, Lucerne (CH); Hans Streubel, Erkrath (DE)

(73) Assignees: SMS Demag AG, Düsseldorf (DE); Main Management Inspiration AG, Hergiswil (CH)

( * ) Notice: Subject to any disclaimer, the term of this patent is extended or adjusted under 35 U.S.C. 154(b) by 532 days.

(21) Appl. No.: 10/489,892

(22) PCT Filed: Sep. 13, 2002

(86) PCT No.: PCT/EP02/10277

§ 371 (c)(1),
(2), (4) Date: Aug. 13, 2004

(87) PCT Pub. No.: WO03/024645

PCT Pub. Date: Mar. 27, 2003

(65) Prior Publication Data

US 2004/0256077 A1 Dec. 23, 2004

(30) Foreign Application Priority Data

Sep. 18, 2001 (CH) ..................... 1715/01
Apr. 12, 2002 (CH) ..................... 0615/02

(51) Int. Cl.
*D21G 1/02* (2006.01)
*B29C 43/46* (2006.01)

(52) U.S. Cl. ................. 492/6; 492/5; 492/4; 492/9; 492/15; 492/46; 100/170; 100/162 B; 72/241.6

(58) Field of Classification Search ................. 492/4, 492/5, 6, 7, 8, 9, 15, 46; 100/35, 162 B, 100/170, 176, 162 R, 38; 72/241.6, 241.4, 72/241.2; 493/474
See application file for complete search history.

(56) References Cited

U.S. PATENT DOCUMENTS 3,543,366 A 12/1970 Collet (Continued)

FOREIGN PATENT DOCUMENTS

DE 3839110 6/1989

(Continued)

*Primary Examiner*—Essama Omgba
(74) *Attorney, Agent, or Firm*—Friedrich Kueffner

(57) ABSTRACT

The invention relates to a casting roller (1), for a double-roller continuous casting machine, in particular for the casting of a steel strip, comprising a cylinder sleeve (2) which may rotate about a fixed axle (5). Intermediate rings (7b, 7c, 7d) rotating with the cylinder sleeve (2) are arranged between the cylinder sleeve (2) and the axle (5), which are provided with radial pressure means (9), acting on the cylinder sleeve (2). The above comprise a pressure chamber (10), pressurized with a fluid pressure medium and acting on a pressure ring (24) fixed to the inner wall of the cylinder sleeve (2), which may be deformed in the radial direction by inductive heating or radiated heat. The external profile of the casting roller (1) may be globally altered or local fine adjustments made by pressurizing the pressure chamber (10) with the pressure medium, or by heating the pressure ring (24).

15 Claims, 5 Drawing Sheets

U.S. PATENT DOCUMENTS

| | | | |
|---|---|---|---|
| 3,706,119 A | | 12/1972 | Collet |
| 3,997,953 A | * | 12/1976 | Christ et al. ............. 492/2 |
| 4,091,517 A | * | 5/1978 | Lehmann et al. ............. 492/5 |
| 4,472,865 A | * | 9/1984 | Schiel et al. ............. 492/7 |
| 4,583,273 A | * | 4/1986 | Schnyder et al. ............. 492/5 |
| 4,598,448 A | * | 7/1986 | Schiel et al. ............. 492/7 |
| 4,651,547 A | * | 3/1987 | Morel et al. ............. 72/9.1 |
| 4,793,250 A | | 12/1988 | Niskanen |
| 4,813,349 A | * | 3/1989 | Pav et al. ............. 100/162 B |
| 4,848,119 A | * | 7/1989 | Pav et al. ............. 72/13.3 |
| 4,852,229 A | * | 8/1989 | Crouse ............. 492/7 |
| 5,010,633 A | * | 4/1991 | Brown et al. ............. 492/5 |
| 5,033,176 A | * | 7/1991 | Schiel ............. 492/7 |
| 5,152,041 A | * | 10/1992 | Link et al. ............. 492/7 |
| 5,290,223 A | * | 3/1994 | Lehmann ............. 492/7 |
| 5,393,290 A | * | 2/1995 | Lehmann et al. ............. 492/16 |
| 5,823,927 A | * | 10/1998 | Van Haag ............. 492/7 |
| 5,871,428 A | * | 2/1999 | Renn et al. ............. 492/7 |
| 6,497,177 B2 | * | 12/2002 | Brendel et al. ............. 100/35 |
| 6,796,929 B2 | * | 9/2004 | Meschenmoser ............. 492/7 |
| 7,182,721 B2 | * | 2/2007 | van Haag ............. 492/6 |
| 7,341,550 B2 | * | 3/2008 | van Haag ............. 492/42 |
| 2005/0250632 A1 | * | 11/2005 | Haag ............. 492/7 |

FOREIGN PATENT DOCUMENTS

| | | | |
|---|---|---|---|
| DE | 19506871 C1 | * | 9/1996 |
| DE | 100 59 304 A1 | | 6/2002 |
| EP | 0429385 | | 5/1991 |
| FR | 2758282 | | 7/1998 |
| GB | 2029932 A | * | 3/1980 |
| GB | 2041161 A | * | 9/1980 |
| GB | 2327900 | | 10/1999 |

* cited by examiner

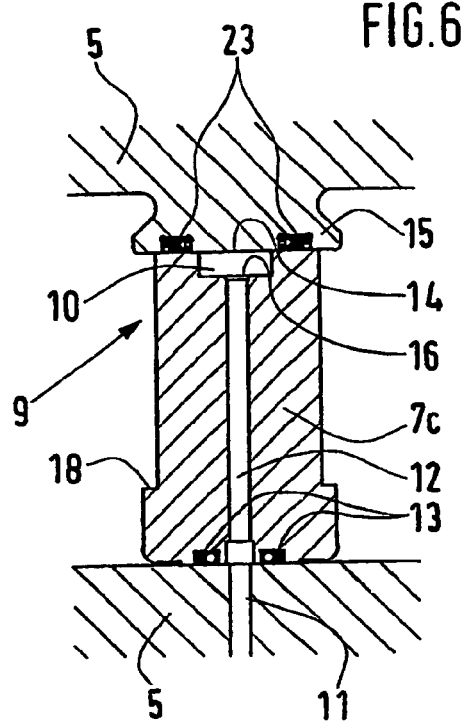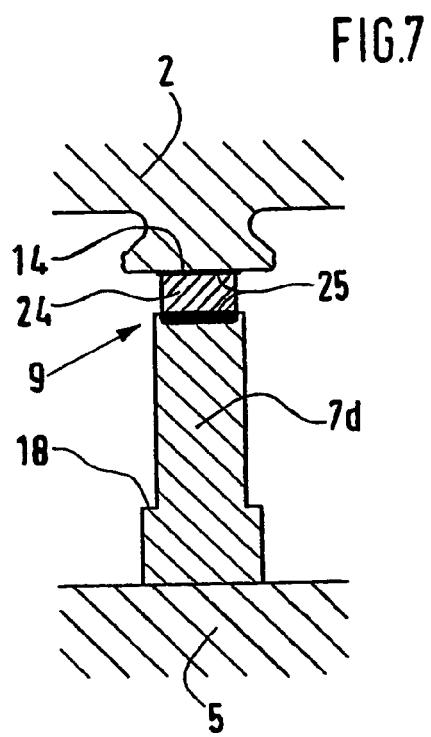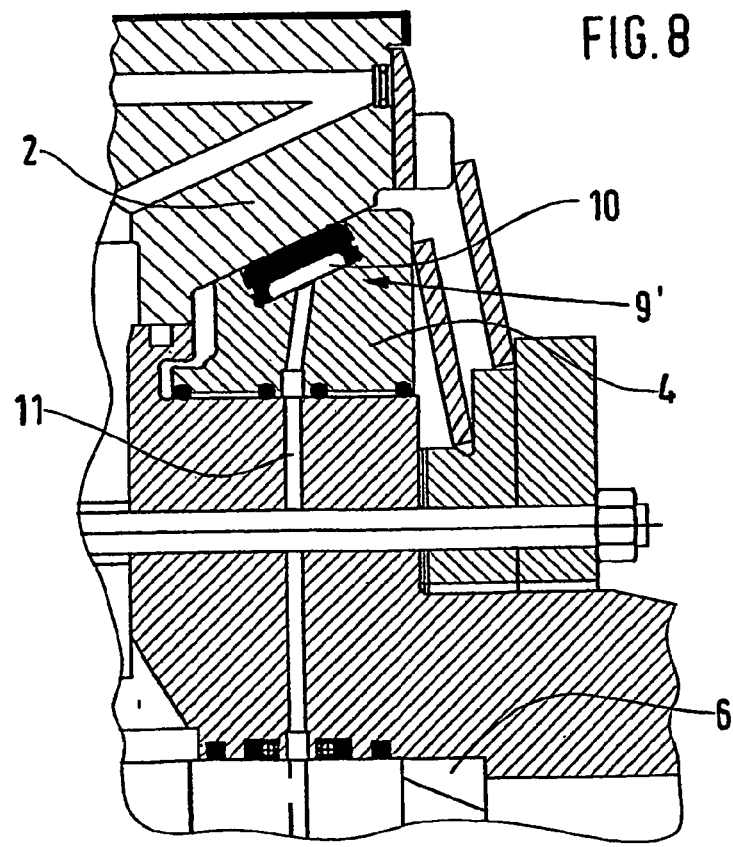

CASTING ROLLER FOR A DOUBLE-ROLLER CONTINUOUS CASTING MACHINE

BACKGROUND OF THE INVENTION

The invention concerns a casting roll for a twin-roll casting machine, especially for casting steel strip, with a cylinder sleeve, which rotates on a stationary axle.

Casting machines of this type work in such a way that, during the operation, the molten metal present in the mold space flows through the casting gap between the counterrotating casting rolls and is shaped into a metal strip.

Due to the high thermal load, the casting sleeves experience convex deformation, which results in a concave profile of the cast strip. This can result in diminished strip quality, especially since the cooling of the strip also causes transverse shrinkage of the strip. For this reason, the casting rolls are concavely shaped in the cold state, so that thermal expansion of the casting rolls produces a parallel or slightly convex shape of the strip, which allows noncritical transverse contraction during cooling of the strip and guarantees the accuracy to gage of the strip.

However, a disadvantage of casting rolls of this type is that, due to their concave shape, they can be used only for a certain influx of molten metal and thus heat input into the casting rolls. If the production parameters and thus the amount of molten metal flowing into the mold are changed, a different heat input and thus different thermal deformation of the casting rolls are obtained, which can result in the cast strip no longer being accurate to gage. The result of all this is that the casting rolls need to have different geometries for different production parameters.

Another disadvantage of concave casting rolls arises during the starting up of the casting machines without a dummy bar. Since in this case the casting gap cannot be completely closed when the casting rolls are run together, liquid steel then leaks out at the bottom, which makes a controlled start-up more difficult.

SUMMARY OF THE INVENTION

The objective of the invention is to avoid these disadvantages and to create a casting roll of the type described above, whose outer contour can be adjusted globally or locally by means that are simple in design and that can be easily and sensitively controlled.

In accordance with the invention, this objective is achieved by installing one or more intermediate rings and/or supporting rings between the cylinder sleeve and the axle. These rings are provided with pressure means that act on the cylinder sleeve. The pressure means are preferably nonrotatably connected with the cylinder sleeve and have a pressure chamber bordering on the inside wall of the cylinder sleeve. A fluid pressure medium can be admitted into the pressure chamber through supply channels in the axle and in the intermediate ring.

When the fluid pressure medium is admitted into the pressure chamber, uniform radial pressure is exerted on the cylinder sleeve. This causes expansion of the cylinder sleeve. Suitable positioning of the intermediate ring or rings along the axle and suitable admission of pressure medium into the pressure chambers make it possible at all times to achieve sensitive adjustment of the profile of the casting sleeve and thus the profile of the strip during the casting process. Accordingly, this makes it possible to compensate for changes in the process parameters without production interruptions. Starting up with or without a dummy bar is also considerably simplified, since it is now possible to bring the conventionally concave form of the casting roll into a cylindrical form, which guarantees complete closing of the casting gap when the casting rolls are run together. This allows a controlled start-up, because molten steel cannot flow out towards the bottom.

To ensure that pressure acts uniformly on the cylinder sleeve, the invention provides that the pressure chamber is annular and completely encircles the intermediate ring.

It is advantageous for the end face of the intermediate ring to abut the inside wall of the cylinder sleeve and for the intermediate ring to have a cavity that forms the pressure chamber. The cavity is bounded at its end face by a flexible seal, which is installed in the cavity and rests against the inside wall of the cylinder sleeve.

In another design in accordance with the invention, a circumferential intermediate gap is present between the intermediate ring and the inside wall of the cylinder sleeve and is spanned by a metal seal that bounds the pressure chamber.

In another variant of the invention, the intermediate ring abuts the inside wall of the cylinder sleeve and has a cavity that forms the pressure chamber, which is bounded on its end face by the inside wall of the cylinder sleeve and is surrounded by one or more outer seals installed in the cylinder sleeve.

It is advantageous for the intermediate ring to be rotatably positioned on the stationary axle and to be provided with one or more seals that seal the transition between the supply channels in the axle and in the intermediate ring.

In an alternative variant of the pressure means of the invention, the invention provides that the pressure means have a co-rotating pressure ring, which is fixed on the inside wall of the cylinder sleeve, rests circumferentially on the intermediate ring and can be expanded in the radial direction by inductive heating. When the pressure ring is heated, it is more or less expanded, and consequently the cylinder sleeve is expanded. In this way, here too it is always possible to adjust the casting roll profile and thus the strip profile as well during the casting process.

It is advantageous for the pressure ring to be provided with thermal insulation.

In the case of casting rolls with several intermediate rings, it is advantageous if they can be moved along the stationary axle.

It is also advantageous if the contact surfaces between the intermediate rings and the inside wall of the cylinder sleeve lie on a common surface.

BRIEF DESCRIPTION OF THE DRAWING

The invention is explained in greater detail below with reference to several embodiments illustrated in the drawings.

FIGS. 4 to 6 show enlarged views of the pressure means of the casting rolls of FIGS. 1 and 2.

FIG. 7 shows the pressure means of the casting roll of FIG. 3, also shown as an enlargement.

FIG. 8 shows a partial section at one of the bearings of the cylinder sleeve, in which pressure means are also present.

DETAILED DESCRIPTION OF THE INVENTION

Figure 1:
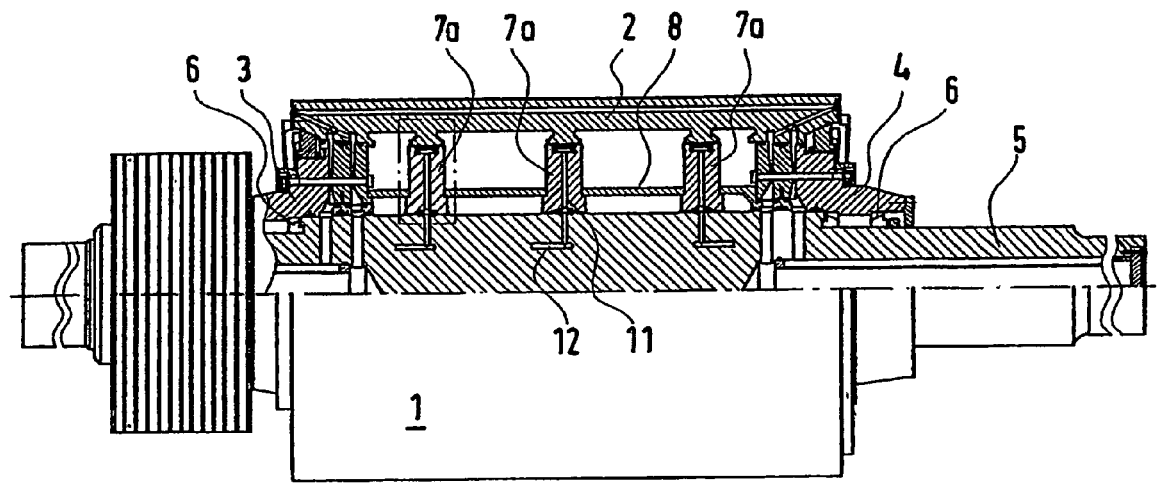
FIG. 1 shows a casting roll of the invention with several intermediate rings, whose pressure means are pressurized with a fluid pressure medium.

The casting roll 1 in FIG. 1 has a cylinder sleeve 2 with supporting rings at its end faces, which, together with the cylinder sleeve 2, can be rotated on a stationary axle 5 supported on bearings 6. Three intermediate rings 7a are installed inside the casting roll 1 and serve the purpose of adjusting the outer profile of the casting roll 1. The intermediate rings 7a re positioned on the stationary axle 5 with spacers 8, which are mounted on the supporting rings 3 and 4.

The intermediate rings 7a rotate together with the cylinder sleeve 2. This co-rotation is effected by the spacers 8 and the supporting rings 3 and 4.

Figure 4:
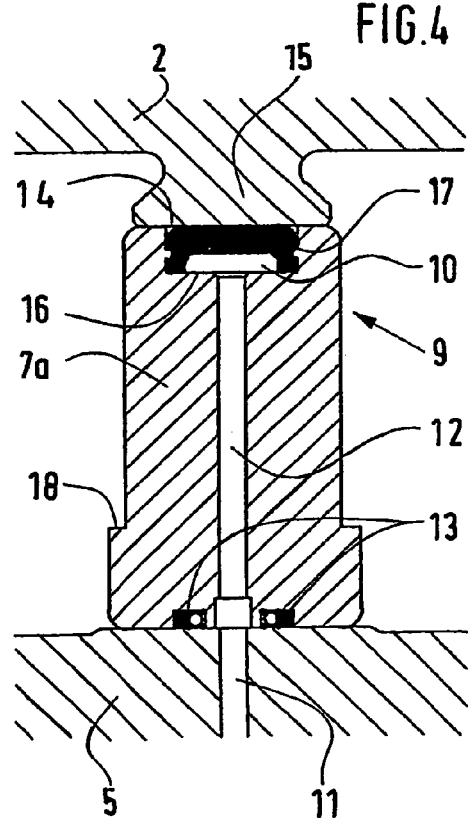

As FIG. 4 shows, the intermediate rings are provided with pressure means 9 with a pressure chamber 10, which has an annular design and encircles the intermediate ring 7a around its entire circumference. A fluid pressure medium, such as hydraulic oil or the like, can be admitted into the pressure chamber 10 through supply channels 11, 12 in the axle 5 and in the intermediate ring 7a. High-viscosity pressure media can be used to apply the necessary pressures. The transition between the supply channels 11 and 12 is sealed with sealing elements 13 installed in the intermediate ring 7a. The end faces of the intermediate rings 7a abut the inside wall 14 of an annular projection 15 of the cylinder sleeve 2, and the intermediate rings 7a have an annular groove 16, which forms the pressure chamber 10 and is bounded at its end face by a flexible seal 17 inserted in the annular groove 16. The intermediate rings 7a also have a shoulder 18, which interacts with the spacers 8 and serves as a positioning aid.

Figure 2:
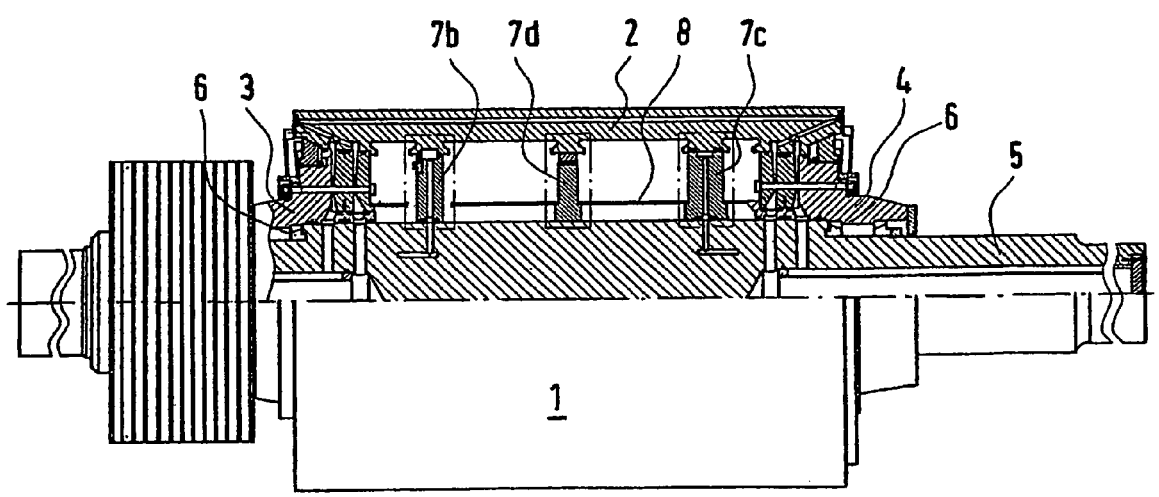
FIG. 2 shows the casting roll from FIG. 1, whose intermediate rings are provided with variants of the pressure means shown in FIG. 1.

The casting roll in FIG. 2 differs from the casting roll in FIG. 1 essentially by the fact that its intermediate rings 7b, 7c, and 7d have designs that are different from that of the intermediate rings 7a.

Figure 5:
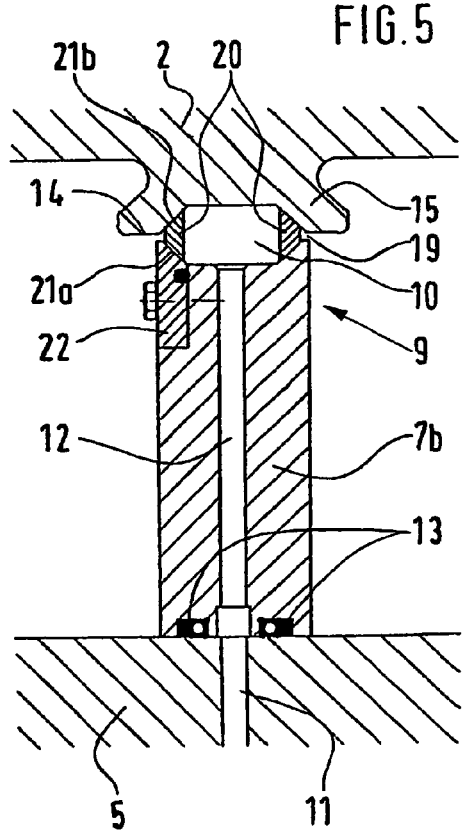

In FIG. 5, which shows the intermediate ring 7b, a circumferential intermediate gap 19 is present between the intermediate ring 7b and the inside wall 14 of the cylinder sleeve 2 and is spanned by a metal seal 20 that bounds the pressure chamber 10. The metal seal 20 is inserted in annular grooves 21a, 21b in the intermediate ring 7b and the cylinder sleeve 2, respectively. It is secured there by an annular flange 22, which is mounted on the side of the intermediate ring 7b. The intermediate ring 7b is also positioned relative to the cylinder sleeve 2 by the metal seal 20, so that the shoulder 18 that would otherwise be present, as in the case of the intermediate ring 7a, can be eliminated.

The intermediate ring 7c shown in FIG. 6 differs from the intermediate ring 7a only in that the flexible seal 17 is not present, and that the end face of the pressure chamber 10 is bounded by the inside wall 14 of the cylinder sleeve 2 and is surrounded by seals 23 installed in the cylinder sleeve 2. In intermediate rings 7a and 7c, the annular groove 16 is designed with a rectangular cross section. However, it is immediately possible in accordance with the invention to design the annular groove 16 with a semicircular cross section. It is also immediately possible to provide several partial annular grooves distributed along the circumference instead of a fully circumferential annular groove.

The intermediate ring 7d in FIG. 7 differs from the intermediate rings 7a, 7b, and 7c in that it is mounted in a stationary way on the stationary axle and does not rotate with the cylinder sleeve. A pressure ring 24, which is mounted in a stationary way and rotates with the cylinder sleeve, is provided on the inside wall 14 of the cylinder sleeve 2 and can be expanded in the radial direction by inductive heating. The pressure ring 24 replaces the pressure chamber 10 of the intermediate rings 7a, 7b, and 7c, which can be pressurized by a pressure medium. The cylinder sleeve 2 is expanded by this pressure ring 24. To further intensify this effect, the pressure ring 24 is provided with insulation 25, which thermally insulates it from the cylinder sleeve 2 and the intermediate ring 7d. The pressure ring 24 can be heated not only inductively from the stationary axle 5, but also by radiant heat, but in this case, no insulation is provided between the pressure ring and the intermediate ring.

Figure 3:
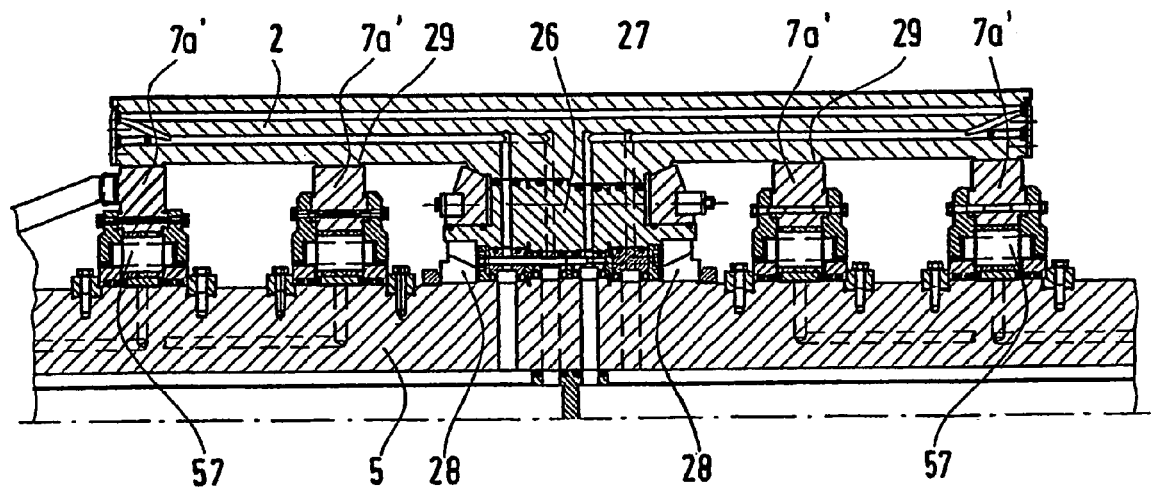
FIG. 3 shows a variant of the casting roll shown in FIGS. 1 and 2, whose intermediate rings are installed outside a central centering and water admission.

The casting roll in FIG. 3 differs from the casting rolls in FIGS. 1 and 2 in that its intermediate rings 7a' are not seated directly on the stationary axle 5, but rather are supported on a coaxial support cylinder 26, which is nonrotatably joined in the middle with the cylinder sleeve 2 by means of clamping rings 27 and can rotate on the stationary axle 5 together with the cylinder sleeve 2 and the intermediate rings 7a'. Bearings 28 for the support cylinder 26 are provided on the axle 5. To position the intermediate rings 7a', the inside wall 14 of the cylinder sleeve 2 is provided with projections 29, and the intermediate rings 7a' are installed by being stopped against the projections 29. As a result, the intermediate rings 7a' have different diameters, starting from the center. The central arrangement of the support cylinder 26 relative to the cylinder sleeve results in the further advantage that, with a possible wedge shape of the strip to be produced, equalization can be ensured by decreasing or increasing the casting gap on one side, as necessary.

By contrast, in the casting roll in FIG. 1, the intermediate rings 7a have the same diameter, so that their contact surfaces with the inside wall 14 of the cylinder sleeve 2 lie on a common surface.

The casting rolls of the invention in accordance with FIGS. 1, 2, and 3 offer individual, multiple operational and positioning possibilities for the intermediate rings 7a, 7a', 7b, 7c, and 7d for the profile adjustment of the cylinder sleeve 2 in the axial direction of the casting roll.

The intermediate rings 7a, 7a', 7b, 7c, and 7d produce negligible supporting forces on the stationary axle of the casting roll. The relative motion between the rotating cylinder sleeve 2 and the stationary axle 5 occurs with extremely low sealing frictional forces.

In addition, the casting roll of the invention is characterized by the fact that it guarantees simple assembly and disassembly, especially of the cylinder sleeve 2.

It is also distinguished by a small structural space in regard to other elements that are to be installed inside the cylinder sleeve 2, such as vibrators, magnetic elements, or the like.

In regard to the casting roll of the invention, the invention also takes into account the fact that, due to the different dimensional stability of the cylinder element 2 and the intermediate rings 7a, 7a', 7b, 7c, and 7d, the latter experience less deformation than the cylinder sleeve 2. This can be influenced by a suitable choice of materials for these parts.

In regard to the expansion of the cylinder sleeve 2 by means of the intermediate rings 7a, 7a', 7b, 7c, and 7d, naturally, the thermal expansion of the cylinder sleeve 2 is also taken into consideration.

FIG. 8 shows another enlarged sectional view of the terminal bearing of the cylinder sleeve 2 of a supporting ring 4, which is also designed as an intermediate ring in accordance with the invention. For this purpose, in a given supporting ring 4, pressure means 9' that act on the cylinder sleeve 2 are provided. It is advantageous for these pressure means 9' to be installed at an angle towards the cylinder sleeve, for example, an angle of about 30° from the horizontal, so that it does not act on the sleeve 2 radially, but rather at the corresponding angle. The pressure means 9' have a pressure chamber 10, which again are connected to a source of pressure medium by supply channels 11.

The surface of the cylinder sleeve can be caused to vibrate by pulsation of the pressure medium in at least one intermediate ring or by a vibrator installed on at least one intermediate ring, so that heat dissipation can be influenced or increased.

Figure 9:
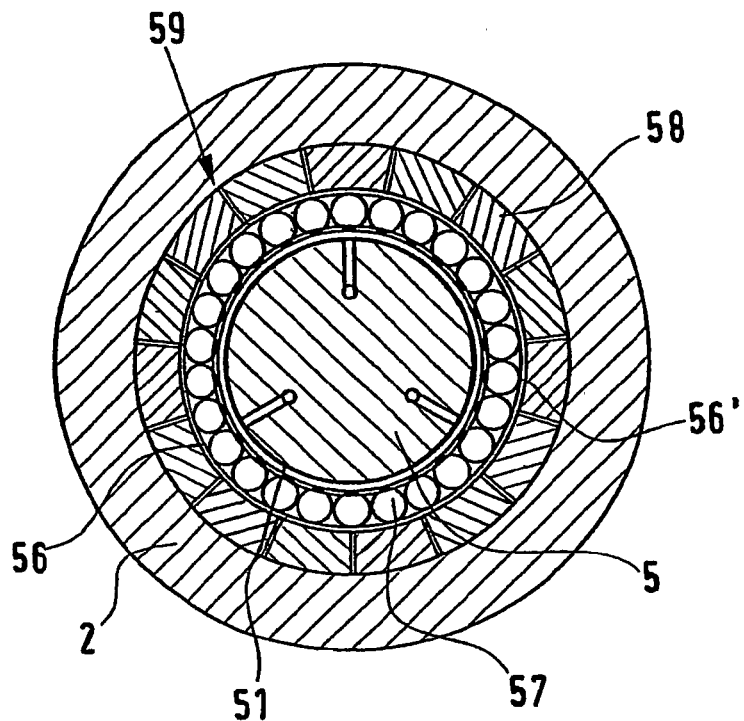
FIG. 9 shows a casting roll in cross section with a variant of the pressure means.
Figure 10:
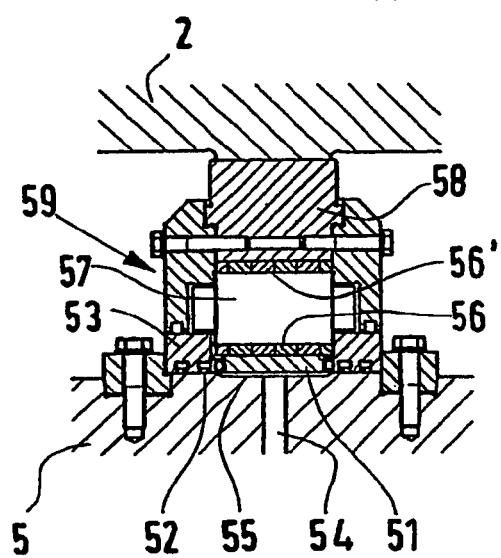
FIG. 10 shows a partial section through the pressure means of FIG. 9.

FIGS. 9 and 10 show a variant of the pressure means 59 by which the cylinder sleeve 2 can be expanded. Preferably, in analogy to the embodiment shown in FIG. 1, several pressure means 59 of this type are installed along the cylinder sleeve 2, which make it possible for this sleeve 2 to be uniformly expanded at least over a portion of its total length.

The pressure means 59 have an expansion ring 51, between the axle and which a pressure chamber 55 is formed, which is connected to a pressure medium supply 54 and is laterally sealed by suitable sealing means 52, 53. The expansion ring 51 is surrounded by a spiral bush 56, which has a spiral design and an axis coaxial to the axis of the axle 5 and which, during an expansion, expands accordingly. This spiral bush 56 forms the inner ring of an encapsulated roller bearing 57, which on the outer side is likewise formed by a spiral bush 56' of this type. Segments 58' that form a ring are also present between the spiral bush 56' and the cylinder sleeve 2. The outer surfaces of these segments 58 abut the inside of the sleeve 2.

The expansion ring 51 radially expanded by the pressure medium, for example, a hydraulic oil, expands the inner spiral bush 56, which in turn expands the outer spiral bush 56' via the rollers, and the outer spiral bush 56' then expands the cylinder sleeve 2 via the ring 58. These pressure means 59 result in the advantage that, with the expansion ring 51 acted on by a pressure medium and with the spiral bush 56 surrounding the expansion ring 51, no rotating parts are present, so that a seal with greater operational reliability is possible.

Figure 11:
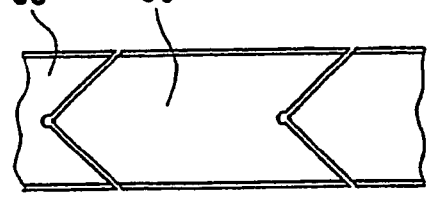
FIG. 11 shows a top view of a portion of segments of the pressure means.

FIG. 11 shows a top view of part of the ring that consists of segments 58. These segments 58 mesh together by corresponding peaks and congruent recesses.

Figure 12:
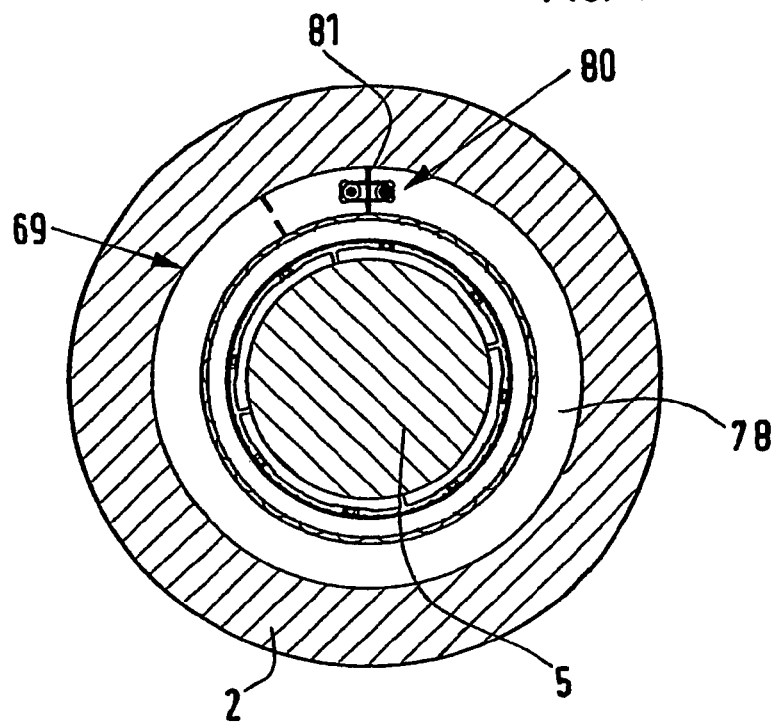
FIG. 12 shows a casting roll in cross section with another variant of the pressure means.
Figure 13:
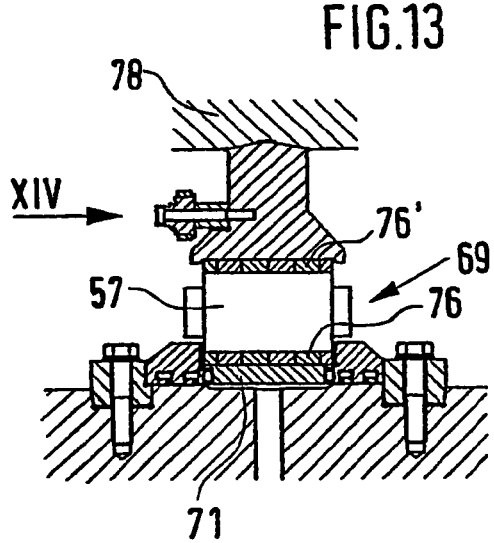
FIG. 13 shows a partial section through the pressure means of FIG. 12.
Figure 14:
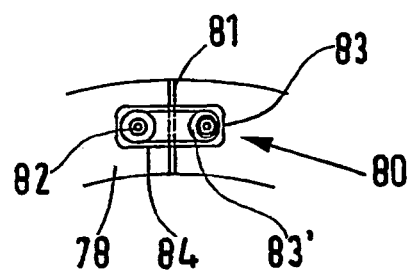
FIG. 14 shows an enlarged view of the fastening device in arrow direction XIV in FIG. 13.

Another variant is shown in FIGS. 12, 13, and 14, which illustrate pressure means 69 designed similarly to the pressure means of FIGS. 9 and 10. In this case, an expansion ring 71 that surrounds the axle 5, a roller bearing 57 with spiral bushes 76, 76' as the inner and outer rings, and a ring 78 are also provided.

As shown in FIG. 14, the ring 78 is divided by a slot 81. This ring 78 and with it the inner spiral bushes can be more or less compressed for assembly by means of a fastening device 80 and thus changed in diameter. For this purpose, the fastening device consists of pins 82, 83, which are fastened to the ring 78 on both sides of the slot and are surrounded by a flexible ring element 84. One of the pins 83 has a cam 83'. The ring 78 can be compressed or loosened by turning this cam 83'.

For different roll diameters of the casting machine, one or more such rings 78 with at least one slot 82 may be provided between the outer spiral bush 76' and the inner side of the cylinder sleeve 5.

The invention claimed is:

1. A casting roll for a twin-roll casting machine, for casting steel strip, with a cylinder sleeve, which can rotate on a stationary axle, in which pressure means for expanding the cylinder sleeve are provided, wherein several pressure means for expanding the cylinder sleeve are installed between the cylinder sleeve and the stationary axle, which have intermediate rings installed between the cylinder sleeve and the stationary axle, which are provided with bearings which allow the cylinder sleeve to rotate on the stationary axle, and that at least one supporting ring is provided, which provides both radial and axial support of the cylinder sleeve on the stationary axle and contains a cooling water supply to the cylinder sleeve, wherein the intermediate rings are rotationally supported on the stationary axle, wherein the outer surface of the cylinder sleeve can be caused to vibrate by pulsation of the pressure medium in at least one intermediate ring or by a vibrator installed on at least one intermediate ring, so that heat dissipation can be increased.

2. The casting roll in accordance with claim 1, wherein one or more intermediate rings and/or supporting rings, which are provided with pressure means that act on the cylinder sleeve, are installed between the cylinder sleeve and the axle, such that the pressure means have a pressure chamber, which borders on the inside wall of the cylinder sleeve and can be pressurized with a fluid pressure medium through supply channels in the stationary axle and in the one or more intermediate rings, so that these pressure means act radially or obliquely on the cylinder sleeve.

3. The casting roll in accordance with claim 2, wherein the pressure chamber is annular and extends completely around the one or more intermediate rings.

4. The casting roll in accordance with claim 2, wherein an end face of the one or more intermediate rings or the supporting ring abuts the inside wall of the cylinder sleeve, and that the intermediate ring or the supporting ring has a cavity, which forms the pressure chamber and is bounded at its end face by a flexible seal, which is installed in the cavity and rests against the inside wall of the cylinder sleeve.

5. The casting roll in accordance with claim 2, wherein a circumferential intermediate gap is present between the one or more intermediate rings and the inside wall of the cylinder sleeve and is spanned by a metal seal that bounds the pressure chamber.

6. The casting roll in accordance with claim 2, wherein the one or more intermediate rings abut the inside wall of the cylinder sleeve and have a cavity, which forms the pressure chamber, are bounded at their end faces by the inside wall of the cylinder sleeve, and are surrounded by one or more outer seals installed in the cylinder sleeve.

7. The casting roll in accordance with claim 2, wherein the one or more intermediate rings are provided with one or more sealing elements that seal the transition between the supply channels in the stationary axle and in the one or more intermediate rings.

8. The casting roll in accordance with claim 1, wherein the pressure means consist of a co-rotating pressure ring, which is mounted in a stationary way on the inside wall of the cylinder sleeve and can be expanded in the radial direction by inductive heating.

9. The casting roll with several intermediate rings in accordance with claim 1, wherein the intermediate rings can be moved along the axle.

10. The casting roll with several intermediate rings in accordance with claim 1, wherein the contact surfaces of the intermediate rings with the inside wall of the cylinder sleeve lie on a common surface.

11. The casting roll in accordance with claim 1, wherein the intermediate rings are nonrotatably joined with the cylinder sleeve.

12. The casting roll in accordance with claim 1, wherein the intermediate rings are installed outside a central centering, to which coolant supply and carry-away lines are assigned.

13. A casting roll for a twin-roll casting machine, for casting steel strip, with a cylinder sleeve, which can rotate on a stationary axle, in which pressure means for expanding the cylinder sleeve are provided, wherein several pressure means for expanding the cylinder sleeve are installed between the cylinder sleeve and the stationary axle, which have intermediate rings installed between the cylinder sleeve and the stationary axle, which are provided with bearings which allow the cylinder sleeve to rotate on the stationary axle, and that at least one supporting ring is provided, which provides both radial and axial support of the cylinder sleeve on the stationary axle and contains a cooling water supply to the cylinder sleeve, wherein the intermediate rings are rotationally supported on the stationary axle, wherein pressure means are provided, in which at least one expansion ring, which serves as the pressure means for the expansion, and a roller bearing are installed between the stationary axle and the cylinder sleeve.

14. The casting roll in accordance with claim 13, wherein the roller bearing has an inner and an outer ring, at least one of which is designed as a spiral bush, such that the spiral bush has a spiral design with an axis coaxial to the stationary axis of the axle and during an expansion expands accordingly.

15. The casting roll in accordance with claim 13, wherein a pressure chamber, which is connected to a pressure medium supply, is formed between the expansion ring and the axle, that a spiral bush, which surrounds the expansion ring, a roller bearing, and another spiral bush are provided, and that, in addition, a multi-segment ring is present between the spiral bush and the cylinder sleeve.

* * * * *